Feb. 16, 1932.  H. C. BECKMAN  1,845,072
MEANS FOR FEEDING COWS DURING MILKING
Filed July 8, 1930   2 Sheets-Sheet 1
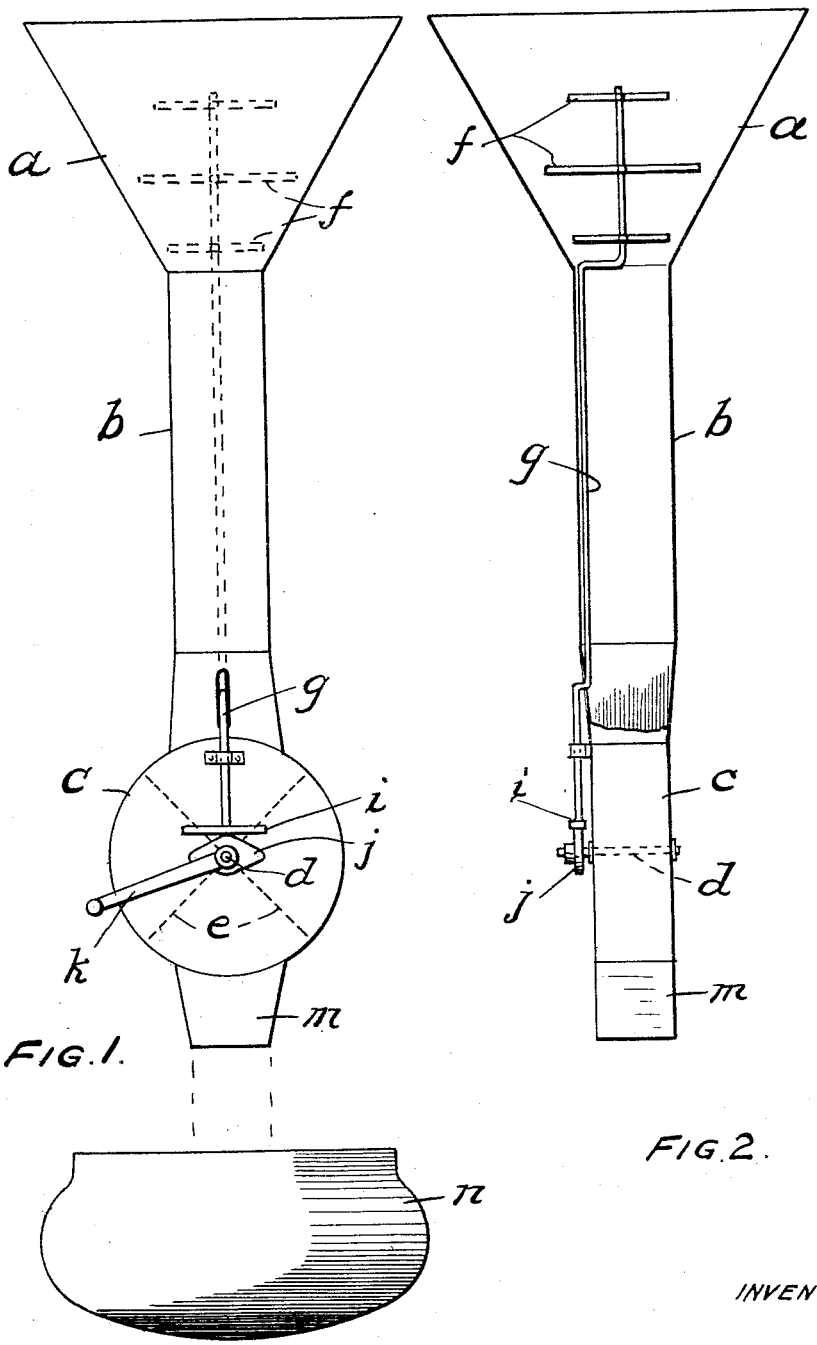

Feb. 16, 1932.      H. C. BECKMAN      1,845,072
MEANS FOR FEEDING COWS DURING MILKING
Filed July 8, 1930      2 Sheets-Sheet 2
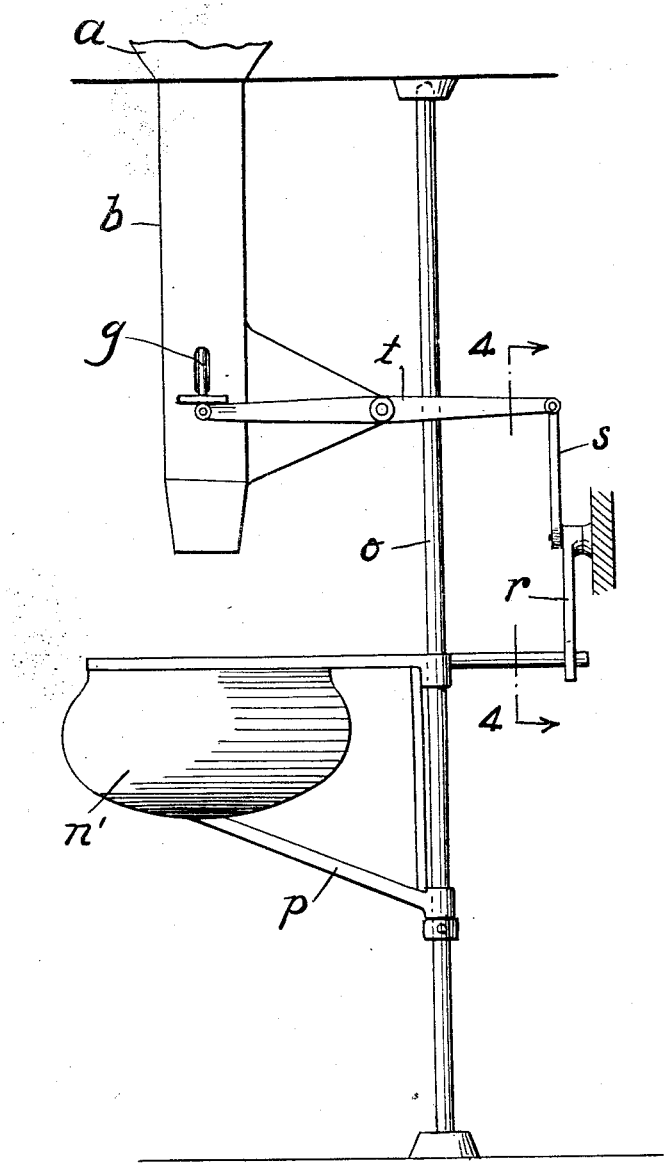
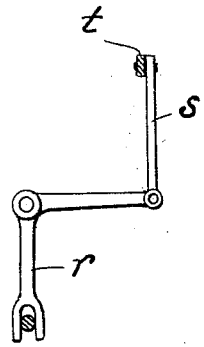
INVENTOR
Herman C. Beckman
BY
Busser and Harding
ATTORNEYS.

Patented Feb. 16, 1932

1,845,072

UNITED STATES PATENT OFFICE

HERMAN C. BECKMAN, OF CHICAGO, ILLINOIS, ASSIGNOR TO THE DE LAVAL SEPARATOR COMPANY, OF NEW YORK, N. Y., A CORPORATION OF NEW JERSEY

MEANS FOR FEEDING COWS DURING MILKING

Application filed July 8, 1930. Serial No. 466,416.

It has been long known, in large dairy herds, to milk cows in relays, the cows being conducted to a separate milking room fitted with stalls, where each cow is milked in turn and is released when the milking operation is completed, the cow returning to her accustomed stall or paddock, her place in the milking stall being taken by the next succeeding cows. In some instances the cows receive a grain ration during their milking period. In one such system, sometimes designated the "Meyer's cafeteria system", the cows receive a portion of their ration in a preliminary stall, where they are washed, and another portion or portions in one or more succeeding stalls. In this "cafeteria system", a description of which was published in the "Kansas Farmer" of January 2, 1926, and the "De Laval Monthly" of April, 1926, a feed hopper was installed in the floor above and a measured quantity of feed was delivered from the hopper to a manger or feed box. The use of such means for delivering measured feed was not, however, satisfactorily operative, since the feed would not drop down freely but would lodge in or bridge over the hopper. For this reason, notwithstanding the obvious advantages of such a feed delivery, its use has since been abandoned. At the present time the milker usually dips out the feed from a barrel and deposits it in the feed box just before milking.

It is the object of my invention to provide, for use in this so-called "cafeteria system" of milking, means whereby the required amount of feed may be so fed from an overhead hopper into a feed box accessible to the cow that the danger of clogging or bridging over at the mouth of the hopper will be avoided and whereby an approximately definite amount of feed will be supplied to the feed box with substantial certainty.

Preferred embodiments of my invention are shown in the accompanying drawings, in which—

Fig. 1 is an elevational view of the feed supply device, the feed box being shown in side view.

Fig. 2 is a view, partly in vertical section, at right angles to Fig. 1.

Fig. 3 is an elevational view of a modification.

Fig. 4 is a view, on line 4—4 of Fig. 3, of a detail.

Referring first to the device shown in Figs. 1 and 2: From hopper $a$ extends downward a conduit $b$ communicating at its lower end with a cylindrical measuring chamber $c$ through the center of which extends a shaft $d$ carrying radial wings $e$. An agitator for the grain in the hopper comprises a vertical rod $g$ carrying transverse agitating bars $f$ positioned within the hopper. The rod $g$ extends down from the agitating bars $f$ within conduit $b$ and thence, through a hole in the conduit along the outside thereof, and at its lower end is provided with an abutment $i$ adapted to be engaged by a cam $j$ on the shaft $d$. By means of a crank arm $k$ on the shaft $d$ the shaft is turned to bring the sector-shaped compartments formed by wings $e$ successively into alignment with conduit $b$ and also with a discharge nozzle $m$ positioned over the feed box or manger $n$. Thereby, at each quarter turn of shaft $d$, a measured quantity of feed is discharged from the conduit into the measuring device and supplied by the measuring device to the feed box. The turning of shaft $d$ imparts a vertical movement to the agitator, which prevents any clogging or bridging of the feed in the hopper.

The device shown in Figs. 3 and 4 comprises a hopper, conduit, and agitator similar to those shown in Figs. 1 and 2. The feed box or manger $n'$ is shown as carried by a bracket $p$ which is swingable on a vertical standard $o$ through a small arc. A horizontal arm on bracket $p$ engages the forked end of a bell crank $r$, pivoted on any convenient support. The other arm of the bell crank is connected, by means of a link $s$, with one arm of a lever $t$, whose other arm underrides an abutment on the lower end of the agitator rod $g$. The back and forth side swing of the feed box, through the connections described, imparts the desired up and down movement to the agitator.

The constructions shown and described merely illustrate an invention which may be embodied in different specific constructions.

Having now fully described my invention, what I claim and desire to protect by Letters Patent is:

1. A device for feeding cows during milking which comprises a feed box, a hopper located above the feed box and adapted to hold a supply of feed, a conduit extending downward from the hopper, a measuring device below and communicating with the hopper and positioned above the feed box, an agitator located in the hopper and adapted when operated to prevent clogging of the feed in the hopper, mechanism to operate the agitator, and a manually operable device connected with and adapted to operate both the measuring device and the operating mechanism.

2. A device for feeding cows during milking which comprises a feed box, a hopper located above the feed box and adapted to hold a supply of feed, a conduit extending downward from the hopper toward the feed box, an agitator located in the hopper and adapted when operated to prevent the clogging of the feed in the hopper, and mechanism to operate the agitator, said mechanism comprising a rod extending downward within the conduit and thence to a point outside the conduit and means to reciprocate the rod vertically.

3. A device for feeding cows during milking which comprises a feed box, a hopper located above the feed box and adapted to hold a supply of feed, a conduit extending downward from the hopper toward the feed box, an agitator located in the hopper and adapted when operated to prevent the clogging of the feed in the hopper, and mechanism to operate the agitator, said mechanism comprising a rod extending downward within the conduit and thence to a point outside the conduit, a measuring device below and communicating with the conduit and above and communicating with the feed box, said measuring device comprising a chamber, a shaft and wings secured to the shaft, means to turn the shaft, and means operable in the turning of the shaft to vertically reciprocate said rod.

In testimony of which invention, I have hereunto set my hand, at Chicago, Illinois, on this 28th day of June, 1930.

HERMAN C. BECKMAN.